(12) United States Patent
Watanabe (10) Patent No.: US 10,457,039 B2
(45) Date of Patent: Oct. 29, 2019

(54) PRINTHEAD, PRINTING APPARATUS, AND CONTROL METHOD

(71) Applicant: CANON KABUSHIKI KAISHA, Tokyo (JP)

(72) Inventor: Tatsuro Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 15/462,050

(22) Filed: Mar. 17, 2017

(65) Prior Publication Data

US 2017/0282534 A1    Oct. 5, 2017

(30) Foreign Application Priority Data

Mar. 31, 2016  (JP) .................................. 2016-073176

(51) Int. Cl.
*B41J 2/045*    (2006.01)
*B41J 29/393*   (2006.01)

(52) U.S. Cl.
CPC ......... *B41J 2/0451* (2013.01); *B41J 2/04541* (2013.01); *B41J 2/04586* (2013.01); *B41J 29/393* (2013.01)

(58) Field of Classification Search
CPC ... B41J 2/0451; B41J 2/04541; B41J 2/04586
See application file for complete search history.

(56) References Cited

U.S. PATENT DOCUMENTS 8,444,254 B2 *  5/2013  Han ..................... B41J 2/04515
                                              347/57
8,864,276 B2 * 10/2014  Yamato ................ B41J 2/04508
                                              347/19

FOREIGN PATENT DOCUMENTS

JP          10-173496 A       6/1998

* cited by examiner

*Primary Examiner* — Thinh H Nguyen
(74) *Attorney, Agent, or Firm* — Venable LLP (57) ABSTRACT

In order to solve a problem that the skew width of a clock when data is transmitted to printheads changes depending on the characteristics of and variations in the respective printheads integrated in a printing apparatus or the operation mode of the printing apparatus, clock skew is adjusted based on a detection result by an error detection circuit integrated in each printhead when the data is transmitted to the printhead. This makes it possible to adjust skew in accordance with the characteristics of the respective printheads or a status change at the time of a printing operation.

20 Claims, 7 Drawing Sheets

PRINTHEAD, PRINTING APPARATUS, AND CONTROL METHOD

BACKGROUND OF THE INVENTION

Field of the Invention

The present invention relates to a printhead, a printing apparatus, and a control method, and particularly to, for example, a printhead like an inkjet printhead, a printing apparatus which prints by using the printhead, and a control method thereof.

Description of the Related Art

In a recent printing apparatus, a head unit which includes a printhead and an IC (driver IC) for controlling that printhead is used. Such a head unit is supported by a carriage and a carriage driving mechanism, and connected to the main body of the printing apparatus via a carriage. An ASIC for controlling the printing apparatus is integrated on a main board provided in the main body of the printing apparatus. The head unit and the ASIC are connected by a cable for transmitting/receiving various signals containing print data.

An LSI manufacturing process has been developed remarkably in recent years, increasing the influence of a variation inside the IC with an increasing processing speed. Consequently, clock skew occurs. The clock skew is a shift in a timing at which clock signals should be transferred simultaneously to respective portions in an IC chip integrated in the main body of the printing apparatus, depending on a wiring situation or the like. If this clock skew occurs, it becomes difficult to ensure a setup time/hold time for transmitting data properly, and a data transmission error occurs. In the arrangement of the printing apparatus as described above, the print data is transmitted from the ASIC on the main board to the printhead via the cable. Thus, greater importance is placed on a countermeasure against clock skew.

Therefore, for example, Japanese Patent Laid-Open No. 10-173496 has conventionally proposed an arrangement in which clock skew is adjusted automatically in a short time in order to prevent a data transmission error. Japanese Patent Laid-Open No. 10-173496 is characterized by including a plurality of delay circuits which output signals with delays of different delay times to input signals and a plurality of phase determination circuits which determine whether phases of the output signals of the delay circuits fall within a known predetermined period. Then, the delay times of the input signals are adjusted by selecting the delay circuits such that the edges of the signals that have delayed the input signals fall within a predetermined phase determination period, setting the input signals delayed by the delay times as the output signals. This makes it possible to correct skew automatically in a short time. According to Japanese Patent Laid-Open No. 10-173496, it also becomes possible to adjust skew between signals that originally have a phase difference.

In the proposal by Japanese Patent Laid-Open No. 10-173496, however, optimum skew correction considering a characteristic change on a receiving side and a characteristic change according to its operation mode cannot be made because a skew adjustment is performed such that the delayed input signals fall within the known predetermined phase determination period.

If the characteristics of printheads each serving as a data receiving side in the printing apparatus change due to manufacturing variations, a skew width is different for each printhead. For an inkjet printing apparatus, a high voltage is applied to a heater which discharges ink to supply a large current at the time of a printing operation, and thus noise superimposes on a signal line which transmits print data. Hence, the skew width may also be varied by the noise generated at the time of the printing operation. If such a variation in the skew width occurs, it becomes difficult to correct skew with the conventional technique, a timing error occurs, and the printing operation cannot be performed properly.

SUMMARY OF THE INVENTION

Accordingly, the present invention is conceived as a response to the above-described disadvantages of the conventional art.

For example, a printhead, a printing apparatus, and a control method according to this invention are capable of adjusting a skew width appropriately and implementing good printing.

According to one aspect of the present invention, there is provided a printhead comprising: a plurality of print elements; a drive circuit configured to drive the plurality of print elements; a logic circuit configured to input data for driving the plurality of print elements in synchronism with a clock; and a detection circuit configured to detect whether the data input to the logic circuit includes an error and output a result of the detection.

According to another aspect of the present invention, there is provided a printing apparatus which prints on a print medium by using an attachable printhead, the printhead including a plurality of print elements, a drive circuit configured to drive the plurality of print elements, a logic circuit configured to input data for driving the plurality of print elements in synchronism with a clock, and a detection circuit configured to detect whether the data input to the logic circuit includes an error and output a result of the detection, the apparatus comprising: an output unit configured to output the data to the printhead in synchronism with the clock; an input unit configured to input a result detected in the detection circuit of the printhead; an adjustment unit configured to adjust the clock based on the result detected in the detection circuit of the printhead input by the input unit; and a control unit configured to control the output by the output unit by using the clock adjusted by the adjustment unit.

According to still another aspect of the present invention, there is provided a control method of a printing apparatus which prints on a print medium by using an attachable printhead, the printhead including a plurality of print elements, a drive circuit configured to drive the plurality of print elements, a logic circuit configured to input data for driving the plurality of print elements in synchronism with a clock, and a detection circuit configured to detect whether the data input to the logic circuit includes an error and output a result of the detection, the method comprising: outputting the data to the printhead in synchronism with the clock; inputting a result detected in the detection circuit of the printhead; adjusting the clock based on the input result detected in the detection circuit of the printhead; and controlling the output by using the adjusted clock.

The invention is particularly advantageous since clock skew adjustment is performed based on a detection result by an error detection circuit integrated in each printhead when data is transmitted to the printhead, allowing an optimum adjustment according to the characteristics of and a variation in the printhead or the operation status of the printing apparatus.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element" (to be also referred to as a "nozzle" or "heater" hereinafter) generically means an ink orifice or a liquid channel communicating with it, and an element for generating energy used to discharge ink, unless otherwise specified.

<Arrangement of Printing Apparatus (FIG. 1)>

Figure 1:
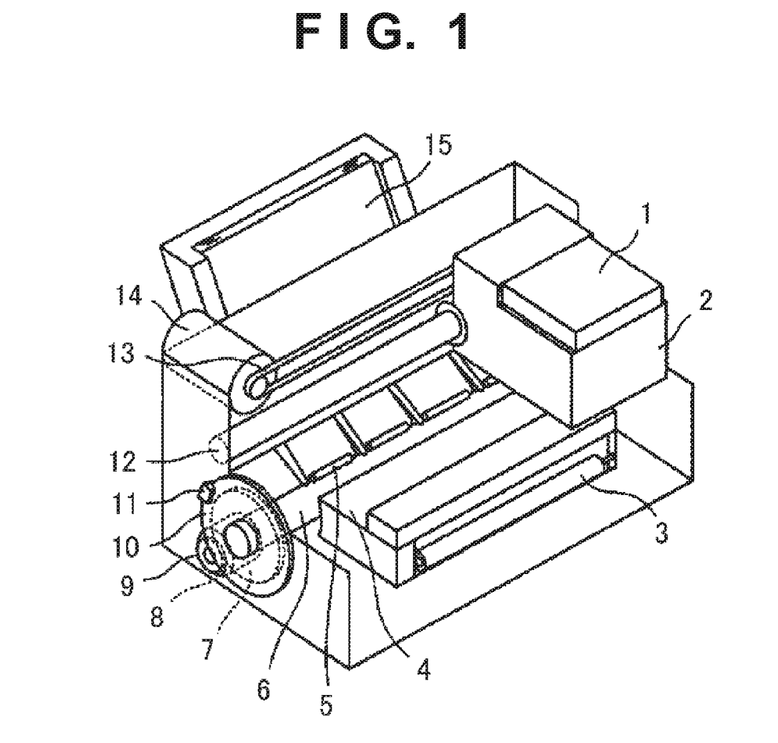
FIG. 1 is a perspective view showing the outer appearance of an inkjet printing apparatus according to an exemplary embodiment of the present invention.

FIG. 1 is a perspective view showing the outer appearance of an inkjet printing apparatus (to be referred to as a printing apparatus hereinafter) according to an exemplary embodiment of the present invention.

In FIG. 1, a carriage 2 which integrates an inkjet printhead (to be referred to as a printhead hereinafter) 1 having a nozzle array made of a plurality of nozzles each discharging ink reciprocally scans in a direction perpendicular to a conveyance direction of a print medium 15 and prints on the print medium. Prior to this printing, the print medium 15 such as printing paper is fed, and the rotating force of a conveyance motor 8 is transmitted to a conveyance roller 6 via a conveyance motor gear 9 and a conveyance gear 7. Then, by rotating the conveyance roller 6, the print medium 15 is conveyed in a direction perpendicular to a scanning direction of the carriage 2 and conveyed to a platen 4 located facing the bottom surface of the printhead 1. Note that paper hold rollers 5 hold the print medium 15.

An encoder film 10 which rotates in synchronism with the conveyance motor 8 is attached to the conveyance gear 7. A slit formed in the encoder film 10 is sensed using an encoder sensor 11 to detect the position of the print medium and further to generate a print timing signal.

The carriage 2 is slidably attached to a shaft 12 and fixed to a belt 13. When a carriage motor 14 is driven, its driving force is transferred to the carriage 2 via the belt, and the carriage 2 moves reciprocally along the shaft 12. The printhead 1 prints by discharging ink onto the print medium as the carriage 2 moves reciprocally.

A discharge roller 3 discharges the print medium 15 printed outside the printing apparatus.

Note that the printhead 1 is arranged attachably to the carriage 2 and can integrate another new printhead.

Figure 2:
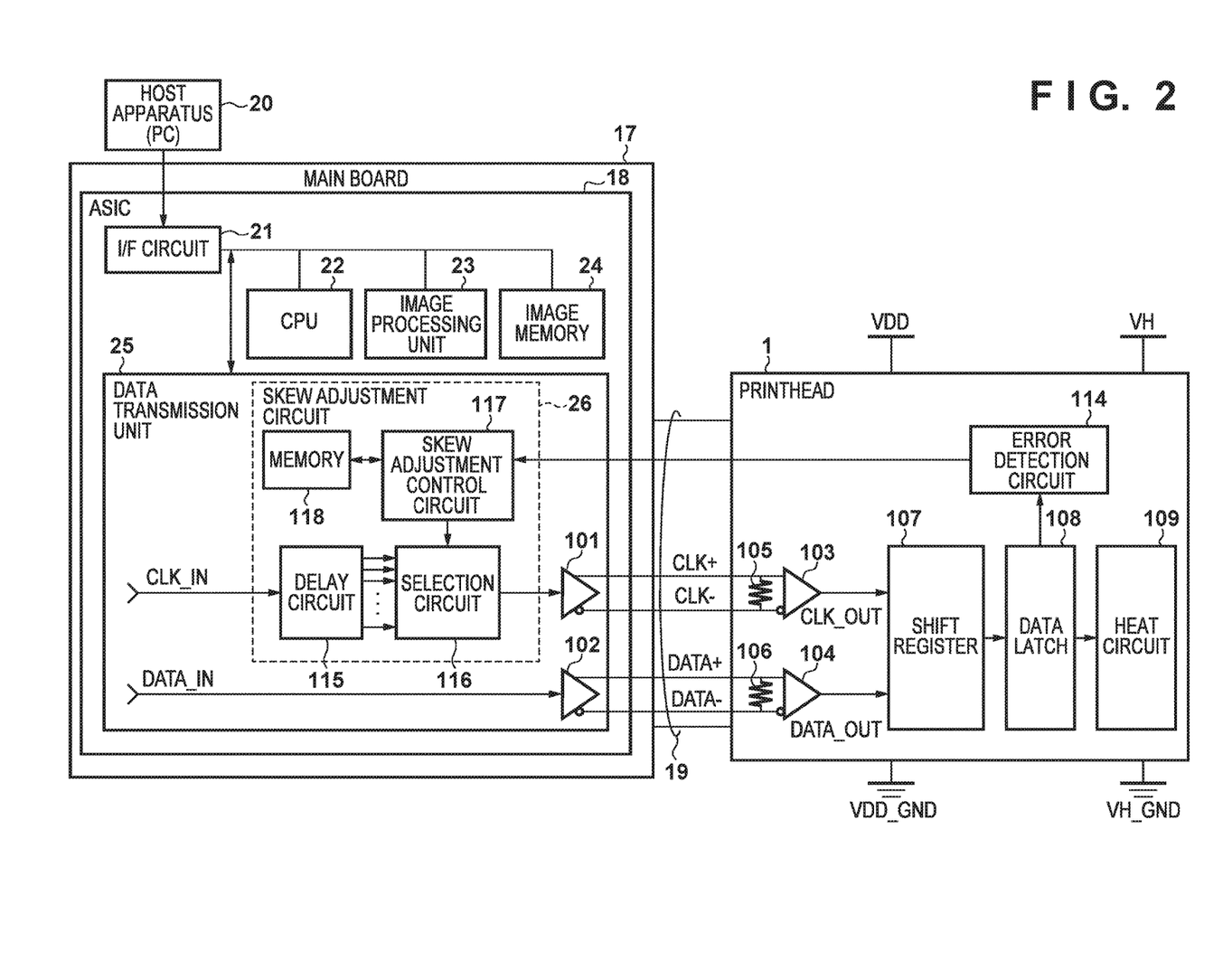
FIG. 2 is a block diagram showing the control arrangement of a printing apparatus and the arrangement of a printhead.

FIG. 2 is a block diagram showing the internal arrangement of the printhead 1 and the control arrangement of the printing apparatus shown in FIG. 1.

As shown in FIG. 2, a main board 17 is provided in the main body of the printing apparatus, and an ASIC 18 which controls the printing apparatus is integrated on the main board 17. Further, an IF/circuit 21, a CPU 22, an image processing unit 23, an image memory 24, and a data transmission unit 25 are incorporated in the ASIC 18. On the other hand, the printhead 1 can be removed from the main body of the printing apparatus for replacement and includes a plurality of print elements which discharge ink. An error detection circuit 114, a shift register 107, a data latch circuit 108, and a heat circuit (drive circuit) 109 are incorporated in the printhead 1.

In the data transmission unit 25 of the ASIC 18, differential signaling drivers 101 and 102 convert clock (CLK_IN) and data (DATA_IN) transmitted in a single-ended format into differential signals. As a result, the differential signaling drivers 101 and 102 output differential signals (DATA+, DATA−, CLK+, and CLK−).

On the other hand, the printhead 1 includes differential signaling receivers 103 and 104 configured to convert the differential signals of data and clock output from the differential signaling drivers 101 and 102 of the ASIC 18 into single-ended signals (CLK_OUT and DATA_OUT). FIG. 2 also shows terminating resistors 105 and 106 which terminate differential signal lines. Note that in this embodiment, differential signals of a Low Voltage Differential Signaling (LVDS) standard are adopted.

As described above, the printhead 1 and the main body of the printing apparatus transmit/receive, by the differential signals, information needed to perform the printing operation.

The main board 17 and the printhead 1 are connected by a flat flexible cable 19 including a plurality of signal lines.

A host apparatus (PC) 20 with which a user generates image data and performs a print product generation instruction, print execution instruction, and the like is connected to the printing apparatus. The interface (I/F) circuit 21 of the ASIC 18 receives a control command and the image data transmitted from the host apparatus (PC) 20. The CPU 22 analyzes the received control command, and the printing apparatus is controlled in accordance with this control command. The image data received by the interface (I/F) circuit 21 is transferred to the image processing unit 23, undergoes various kinds of image processing according to printing methods, and is stored in the image memory 24 as print data. The print data stored in the image memory 24 is read out again when printing.

The data transmission unit 25 transmits, to the printhead 1, the print data that has undergone image processing. A skew adjustment circuit 26 which performs skew correction is incorporated in the data transmission unit 25.

Serial signal (DATA_OUT) output from the differential signaling receiver 103 is stored in the shift register 107 and converted into parallel data. Then, the data latch circuit 108 temporarily stores that parallel data. The heat circuit 109 receives the print data output from the data latch circuit 108 and heat pulse width information defining a time for heating a heater, and drives the heater of the printhead 1. On the other hand, heater driving voltage (VH) for driving the heat circuit 109 in accordance with output data from the data latch circuit 108 is supplied to the heat circuit 109.

Digital power voltage (VDD) is supplied to the printhead 1 in order to drive a logic circuit such as the data latch circuit 108 or the shift register 107. Note that heater driving voltage (VH) and digital power voltage (VDD) are, respectively, connected to terminals VH_GND and VDD_GND for grounding. The error detection circuit 114 detects an error in the data output from the data latch circuit 108. In this embodiment, error detection of reception data is performed by a CRC (cyclic redundancy check), and an error determination is performed.

The skew adjustment circuit 26 is constituted by a delay circuit 115 configured to output clock (CLK_IN) with a delay of a plurality of delay times, a selection circuit 116 which selects the output of clock (CLK_IN) by the delay circuit 115, a skew adjustment control circuit 117, and a memory 118. The skew adjustment control circuit 117 switches the selection circuit 116 in accordance with a detection result by the error detection circuit 114. The memory 118 saves an error detection result received in the skew adjustment control circuit 117.

Automatic skew adjustment sequences by using the printhead and the printing apparatus having the arrangements as described above according to some embodiments will now be explained.

First Embodiment

An automatic skew adjustment sequence when no printing operation is performed will be described here.

Figure 3:
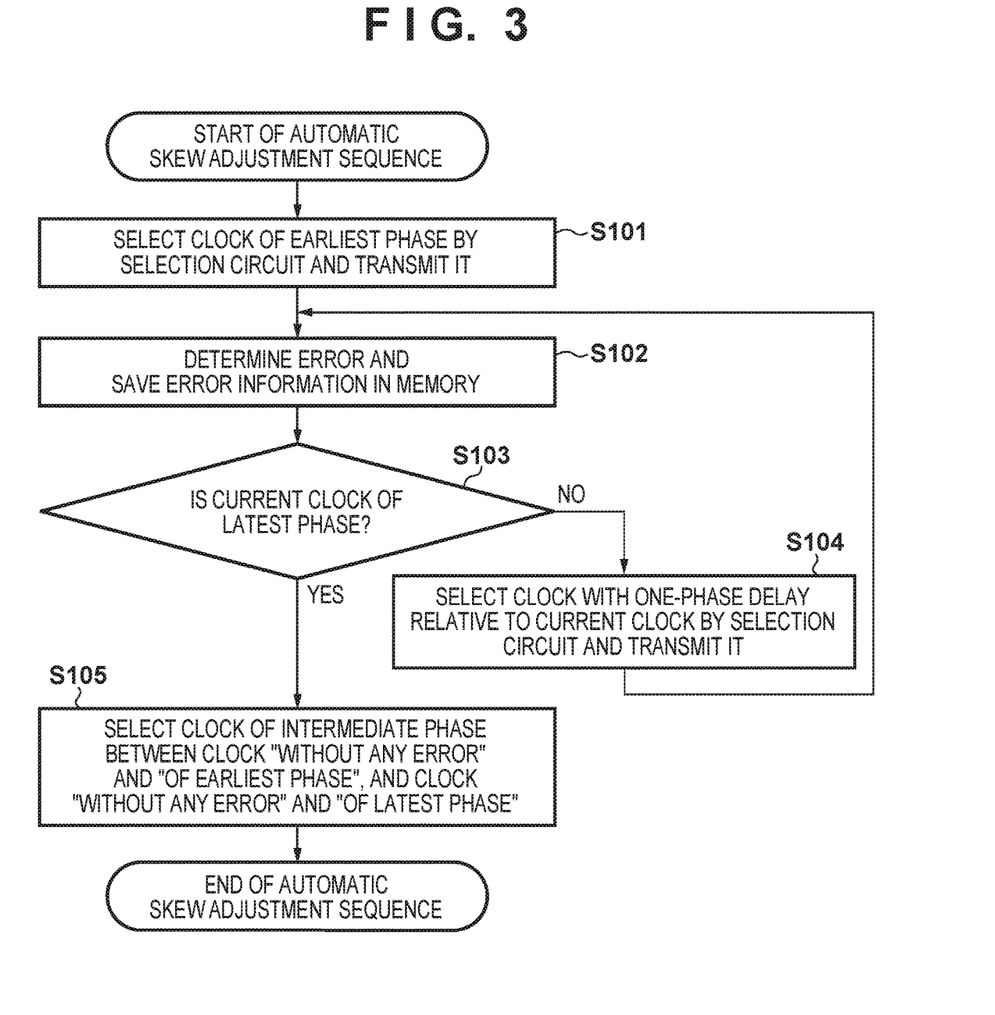
FIG. 3 is a flowchart showing an automatic skew adjustment sequence according to the first embodiment.

FIG. 3 is a flowchart showing the automatic skew adjustment sequence performed in a skew adjustment control circuit.

First, in step S101, a clock of the earliest phase among clocks that can be output by a delay circuit 115 is selected in a selection circuit 116 and transmitted to a printhead 1. Then, in step S102, an error detection circuit 114 of the printhead 1 performs an error determination and as a result, obtained error information is transmitted to an ASIC 18 and saved in a memory 118 included in a skew adjustment circuit 26.

Subsequently, in step S103, it is confirmed whether the error determination is performed in all the clocks different in phase that can be output by the delay circuit 115. As a result, if it is confirmed that a current clock is not a clock of the latest phase among the clocks that can be output by the delay circuit 115, the process advances to step S104. In step S104, the selection circuit 116 selects the clock of the second latest phase after the current clock and transmits it again. Subsequently, the process returns to step S102. In contrast, if it is confirmed in step S103 that the transmitted clock is the clock of the latest phase, the process advances to step S105.

Then, in step S105, a clock having an intermediate phase between a clock "without any error" and "of the earliest phase", and a clock "without any error" and "of the latest phase" is selected as a clock for data transmission.

The automatic skew adjustment is performed based on the sequence as described above.

Figure 4:
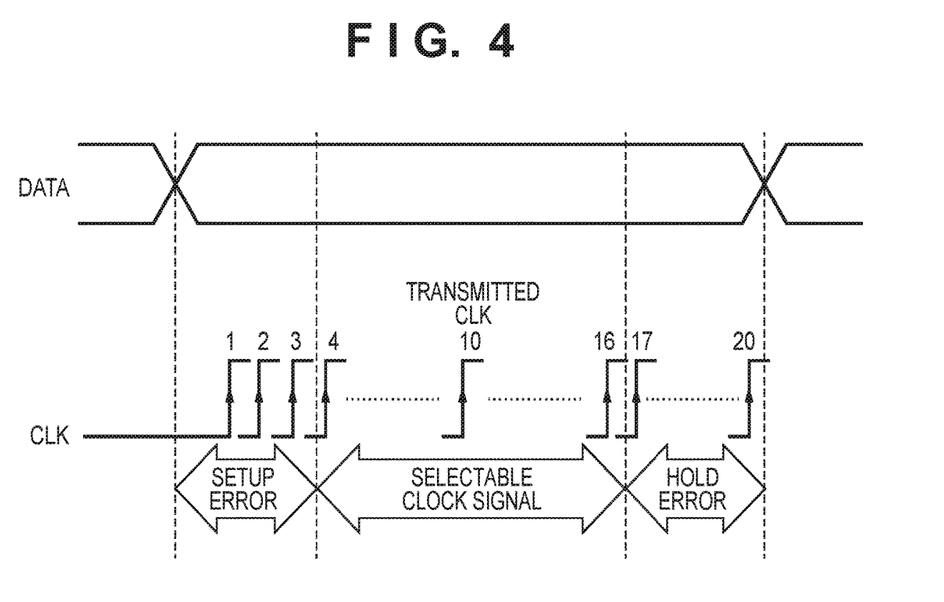
FIG. 4 is a chart showing a specific example of the automatic skew adjustment sequence according to the first embodiment.

FIG. 4 is a chart showing a specific example of the automatic skew adjustment sequence shown in FIG. 3.

As described in a conventional technique, setup errors and hold errors may occur depending on a rising timing of clock (CLK). In the example shown in FIG. 4, clock (CLK) 1 to clock (CLK) 20 indicate clocks of a plurality of stages different in phase that can be output by the delay circuit 115. Out of those 20 clocks, the setup errors occur in clock (CLK) 1 to clock (CLK) 3, and the hold errors occur in clock (CLK) 17 to clock (CLK) 20.

In this embodiment, clock (CLK) 1 to clock (CLK) 20 are sequentially transmitted from a printing apparatus to the printhead 1, and respective error determinations are performed in the printhead 1. In the example shown in FIG. 4, clock (CLK) 10 is selected which has an intermediate phase between clock (CLK) 4 of the earliest phase without any error occurring and clock (CLK) 16 of the latest phase without any error occurring. Subsequently, clock (CLK) 10 is used to transmit data.

Therefore, according to the embodiment described above, it is possible to select an output clock signal from the delay circuit in accordance with a detection result by an error detection circuit of the printhead when the data is transmitted to the printhead. That is, it is possible to prevent a timing error at the time of data transmission by performing a skew adjustment according to the characteristics of each printhead.

Second Embodiment

A sequence in which an automatic skew adjustment is performed in a short time will be described here.

Figure 5:
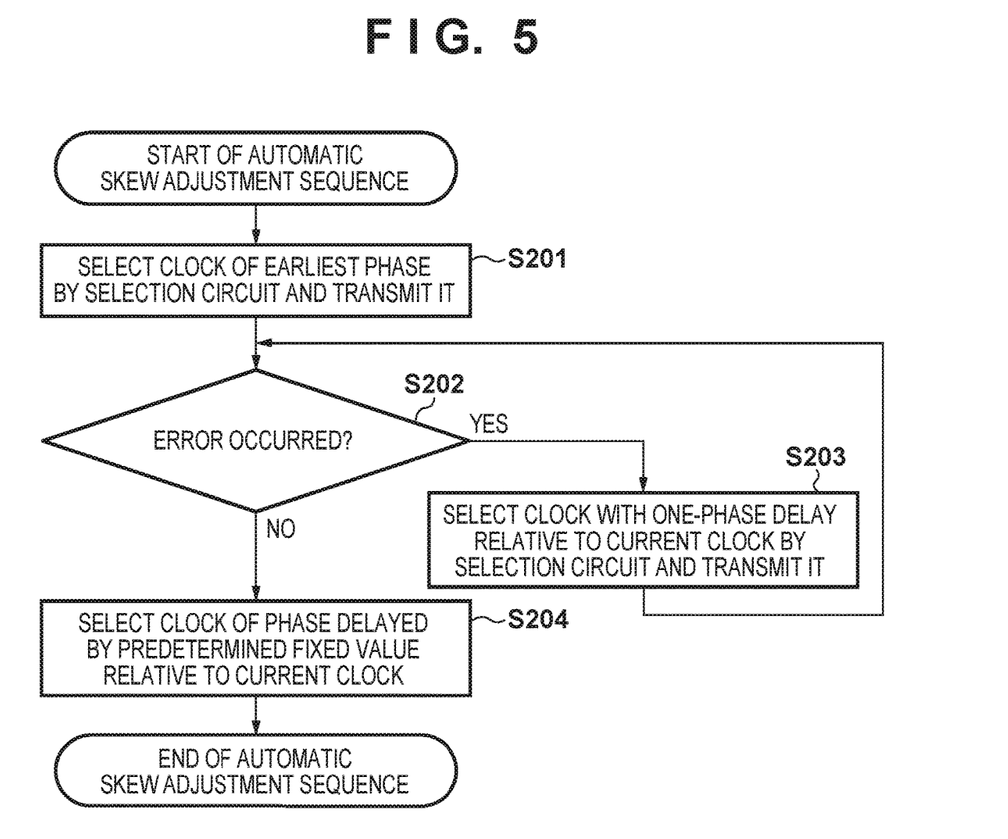
FIG. 5 is a flowchart showing an automatic skew adjustment sequence according to the second embodiment.

FIG. 5 is a flowchart showing an automatic skew adjustment sequence.

In step S201, a clock of the earliest phase that can be output by a delay circuit 115 is selected in a selection circuit 116 and transmitted to a printhead 1. In step S202, it is determined whether an error occurs in an error detection circuit 114 of the printhead 1. If it is determined that the error occurs here, the process advances to step S203 in which a clock with a delay of one phase relative to a current clock is selected in the selection circuit 116 and transmitted to the printhead 1. Subsequently, the process returns to step S202. In contrast, if it is determined that there is no error, the process advances to step S204 in which a clock obtained by adding a predetermined fixed value to the current clock is selected as a clock for data transmission. The predetermined fixed value means a margin value calculated in advance at the time of design.

The automatic skew adjustment is performed based on the sequence as described above.

Figure 6:
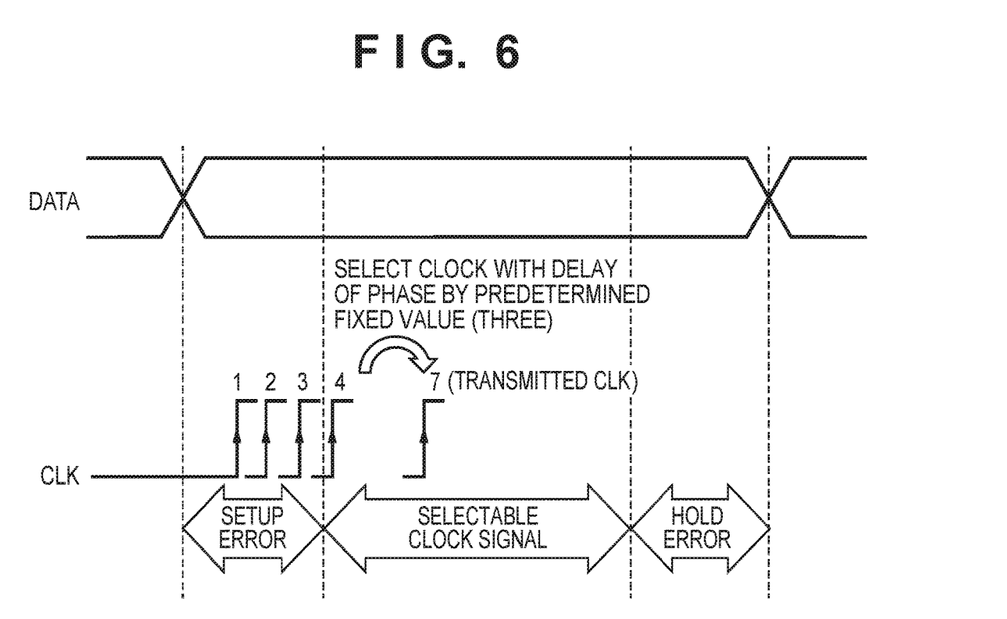
FIG. 6 is a chart showing a specific example of the automatic skew adjustment sequence according to the second embodiment.

FIG. 6 is a chart showing a specific example of the automatic skew adjustment sequence shown in FIG. 5.

According to the example shown in FIG. 6, clocks are transmitted to the printhead 1 sequentially from clock (CLK) 1 serving as the clock of the earliest phase that can be output by the delay circuit 115, and error determinations are performed sequentially in the printhead 1. As a result, clock (CLK) 4 serving as a clock "without any error" and "of the earliest phase" is searched for. After that search, clock (CLK) 7 with a delay of the predetermined fixed value (delay of three) relative to clock (CLK) 4 is selected for data transmission.

In the first embodiment, the error determinations are performed on all the plurality of clocks different in phase that can be output by the delay circuit 115. In contrast, according to the embodiment described above, the error determination is not performed after the search for the clock "without any error" and "of the earliest phase", making it possible to adjust skew in a shorter time.

Third Embodiment

A sequence when an automatic skew adjustment is performed in a printing operation mode will be described here.

A heater of a printhead is driven in order to discharge ink when a printing apparatus operates in the printing operation mode and in the printhead 1 shown in FIG. 2, a large current is supplied from heater driving voltage (VH) to terminal (VH_GND) for grounding. Terminal (VDD_GND) for grounding on a logic-circuit side is also influenced by this large current, and the level of driving voltage (VDD) of a logic circuit varies. As a result, a skew width between data and a clock may vary.

Figure 7:
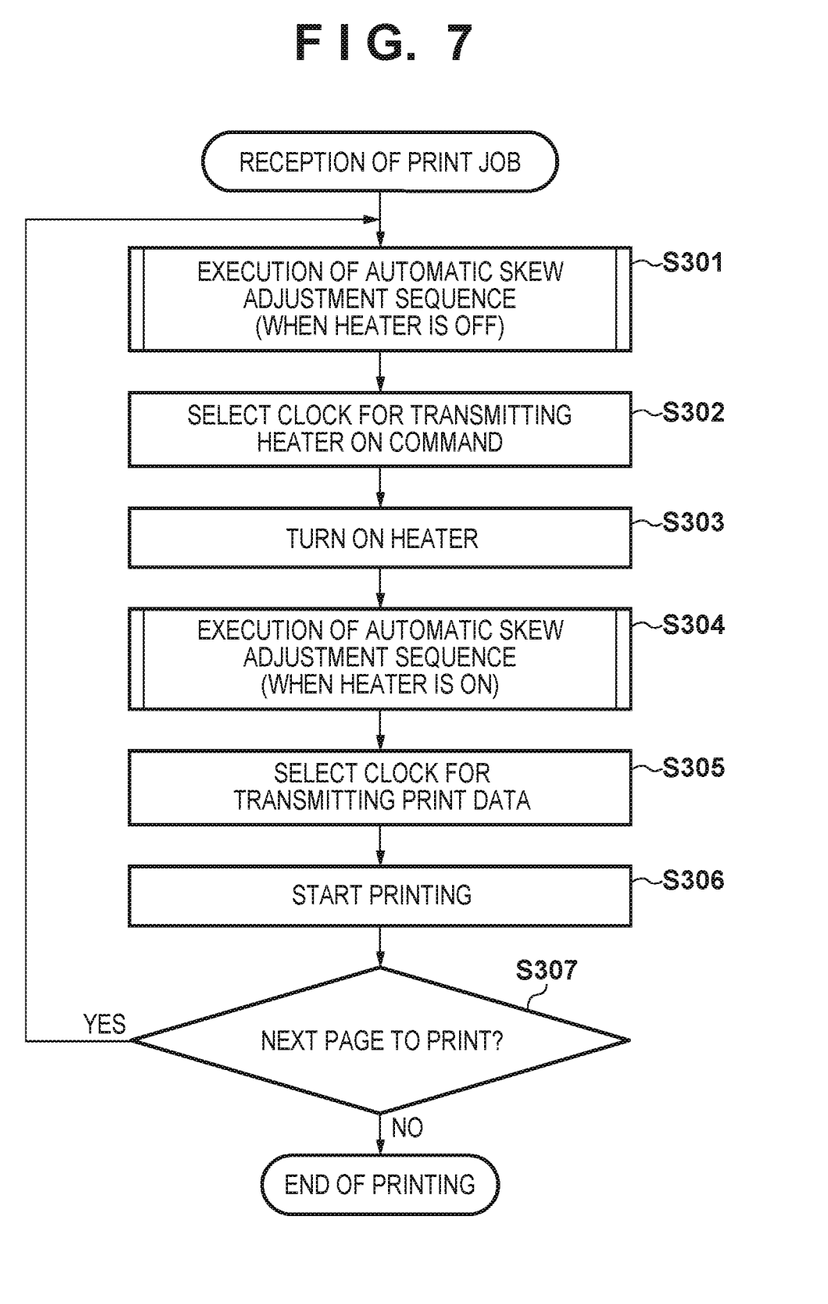
FIG. 7 is a flowchart showing an automatic skew adjustment sequence according to the third embodiment.

FIG. 7 is a flowchart showing an automatic skew adjustment sequence at the time of the printing operation mode.

In step S301, after a print job is received, the automatic skew adjustment sequence is performed in order to transmit print data signal (DATA) for driving the heater of a printhead 1 without any error. This is the process described in the first embodiment with reference to FIG. 3.

Consequently, when printing is not performed, that is, in a state in which the heater is OFF, a clock is selected in consideration of individual characteristics of and manufacturing variations in the printhead.

Then, in step S302, clock (CLK) based on an adjustment result in step S301 is selected in order to transmit print data signal (DATA) and in step S303, the heater of the printhead is turned on. Turning on the heater refers to transmitting a dummy print data signal and a heat enable signal to the printhead 1 as data signal (DATA), and sending an electric current to the heater.

Then, in a state in which the heater is ON, the automatic skew adjustment sequence is performed again in step S304. This is the process described in the first embodiment with reference to FIG. 3. Consequently, data signal (DATA) is transmitted, and the skew adjustment is performed in consideration of an influence in a state in which high-frequency noise caused by transmitting that signal occurs.

Further, in step S305, clock (CLK) based on an adjustment result in step S304 and for transmitting actual print data signal (DATA) is selected.

In step S306, printing the print medium for one page is started by generating a print data signal based on image data transmitted from a host apparatus (PC) 20, synchronizing this with adjusted and selected clock (CLK), and transmitting it to the printhead. Further, in step S307, the presence/absence of the next page to print is confirmed. If it is determined that there is the next page to print here, the process returns to step S301 in which the automatic skew adjustment sequence is performed again. In contrast, if it is determined that there is no next page to print, the process ends.

Therefore, according to the embodiment described above, the skew adjustment is performed considering a variation in the skew width when the heater is driven actually, and thus the skew adjustment is performed considering a state in a more realistic printing operation. This can contribute to high-quality printing. The automatic skew adjustment is performed for each print on the print medium for one page, making it possible to perform the skew adjustment also coping with a characteristic change of the printhead caused by a rise in the temperature of the apparatus itself as printing progresses.

The automatic skew adjustment in the printing operation mode has been described in this embodiment. However, the large current is also supplied from heater driving voltage (VH) to terminal (VH_GND) for its grounding at the time of "short-pulse heating control" performed in order to heat the heater as a printing operation preparation, and thus the automatic skew adjustment is to be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-073176, filed Mar. 31, 2016, which is hereby incorporated by reference herein in its entirety.

What is claimed is:

1. A printhead comprising:
   a plurality of print elements;
   a drive circuit configured to drive the plurality of print elements;
   a logic circuit configured to receive input data for driving the plurality of print elements in synchronism with a clock; and
   a detection circuit configured to detect whether the input data input to the logic circuit includes an error and output a result of the detection used for adjusting the clock.

2. The printhead according to claim 1, wherein the detection circuit performs error detection of the input data by cyclic redundancy check and determines whether the data includes the error.

3. The printhead according to claim 1, further comprising, in order to input the data and the clock as differential signals:
   a first differential signaling receiver configured to input the differential signal of the data; and
   a second differential signaling receiver configured to input the differential signal of the clock.

4. The printhead according to claim 3, wherein the logic circuit includes:
   a shift register configured to input the data received in the first differential signaling receiver and the second differential signaling receiver, and converted into data in a single-ended format in synchronism with the clock; and
   a latch circuit configured to convert the data input to the shift register into parallel data, and
   the detection circuit performs error detection on the data input to the latch circuit.

5. The printhead according to claim 1, wherein the printhead is an inkjet printhead.

6. The printhead according to claim 1, wherein adjustment of the clock is adjustment of clock skew.

7. A printing apparatus comprising:
a printhead including a plurality of print elements, a drive circuit configured to drive the plurality of print elements, a logic circuit configured to receive input data for driving the plurality of print elements in synchronism with a clock, and a detection circuit configured to detect whether the input data input to the logic circuit includes an error and output a result of the detection;
an output unit configured to output the data to the printhead in synchronism with the clock;
an input unit configured to input a result detected in the detection circuit of the printhead and output from the printhead;
an adjustment unit configured to adjust the clock based on the result detected in the detection circuit of the printhead input by the input unit; and
a control unit configured to control the output by the output unit by using the clock adjusted by the adjustment unit.

8. The apparatus according to claim 7, wherein the adjustment unit includes:
a delay circuit configured to delay the clock; and
a selection circuit configured to select, based on the result detected in the detection circuit of the printhead input by the input unit, a clock out of a plurality of clocks delayed by the delay circuit.

9. The apparatus according to claim 8, wherein the delay circuit generates a plurality of clocks different in phase by delaying the clocks by a plurality of different delay times,
the output unit outputs, to the printhead, the plurality of generated clocks different in phase sequentially from a clock of the earliest phase,
the input unit inputs and stores, in a memory, results detected in the detection circuit of the printhead sequentially from the clock of the earliest phase, and
the selection circuit selects, by using the results stored in the memory, a clock between a clock of the earliest phase that determined an absence of an error in the detection circuit of the printhead, and a clock of the latest phase that determined an absence of an error in the detection circuit of the printhead.

10. The apparatus according to claim 8, wherein the delay circuit generates a plurality of clocks different in phase by delaying the clocks by a plurality of different delay times,
the output unit outputs, to the printhead, the plurality of generated clocks different in phase sequentially from a clock of the earliest phase,
the input unit inputs results detected in the detection circuit of the printhead sequentially from the clock of the earliest phase and determines whether the input results indicate occurrence of errors, and
the selection circuit selects, from clocks determined not to indicate occurrence of the errors, a clock with a delay of a predetermined number of phases.

11. The apparatus according to claim 7, wherein the output unit includes, in order to output the data and the clock as differential signals:
a first differential signaling driver configured to output the differential signal of the data; and
a second differential signaling driver configured to output the differential signal of the clock.

12. The apparatus according to claim 11, wherein the differential signals are based on a Low Voltage Differential Signaling (LVDS) standard.

13. The apparatus according to claim 7, wherein an adjustment by the adjustment unit is performed when a printing operation preparation and a printing operation are not performed.

14. The apparatus according to claim 7, wherein an adjustment by the adjustment unit is performed when a printing operation preparation and a printing operation are performed.

15. The apparatus according to claim 14, wherein the adjustment by the adjustment unit is performed every time printing on a print medium is performed for one page.

16. The apparatus according to claim 7, wherein the output unit, the input unit, the adjustment unit, and the control unit are integrated on an ASIC.

17. A control method of a printing apparatus which prints on a print medium by using an attachable printhead, the printhead including a plurality of print elements, a drive circuit configured to receive drive the plurality of print elements, a logic circuit configured to input data for driving the plurality of print elements in synchronism with a clock, and a detection circuit configured to detect whether the input data input to the logic circuit includes an error and output a result of the detection, the method comprising:
outputting the data to the printhead in synchronism with the clock;
inputting a result detected in the detection circuit of the printhead;
adjusting the clock based on the input result detected in the detection circuit of the printhead; and
controlling the output by using the adjusted clock.

18. The method according to claim 17, further comprising, by the detection circuit, performing error detection of the input data by cyclic redundancy check and determining whether the data includes the error.

19. The method according to claim 17, further comprising:
inputting a differential signal of the data by a first differential signaling receiver; and
inputting a differential signal of the clock by a second differential signaling receiver.

20. The method according to claim 17, wherein the printhead is an inkjet printhead.

* * * * *